Feb. 13, 1934.   R. V. JONES   1,947,010
FROZEN CONFECTION
Filed Feb. 27, 1932
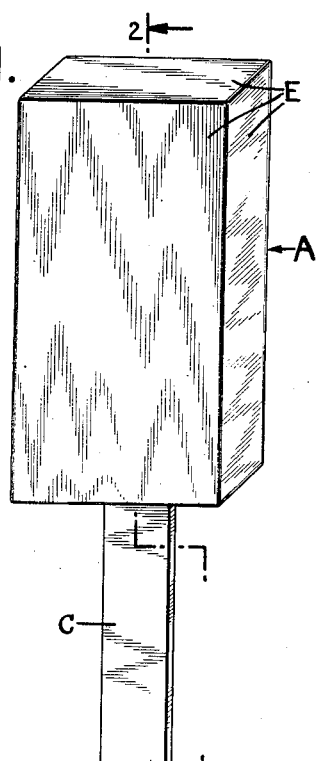
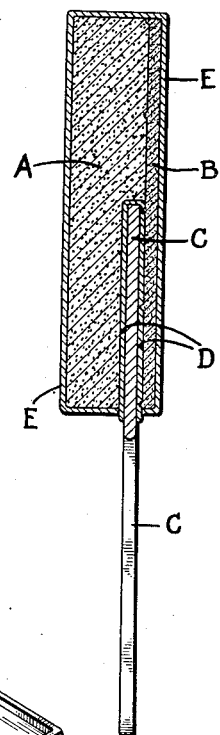
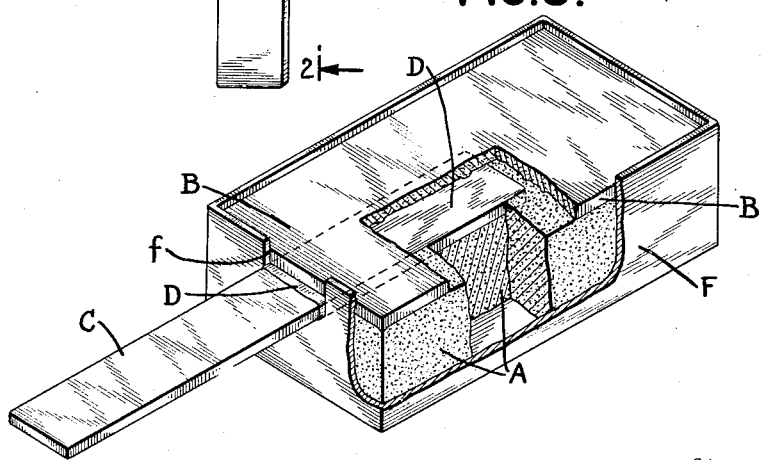
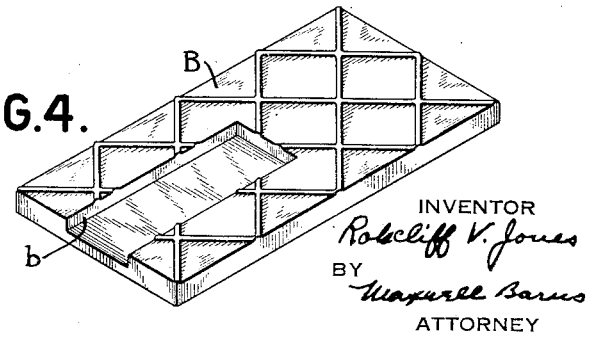
INVENTOR
Robcliff V. Jones
BY Maxwell Barus
ATTORNEY Patented Feb. 13, 1934

1,947,010

UNITED STATES PATENT OFFICE 1,947,010

FROZEN CONFECTION

Robcliff V. Jones, Bronxville, N. Y., assignor to The Borden Company, New York, N. Y., a corporation of New Jersey Application February 27, 1932. Serial No. 595,469

5 Claims. (Cl. 99—16)

This invention relates to frozen confections, and more particularly to a confection consisting of a block or figure of ice cream or a similar frozen substance, mounted on or provided with a handle by which it may be held while being consumed. Frozen confections of the general type referred to are old and well known, and no invention is claimed in the provision of a confection broadly of that type, but it is the object of the present invention to provide a confection in which the connection between the ice cream or other frozen substance and the handle is effected through the intermediation of a wafer of relatively large surface area to one side of which the ice cream readily adheres, and hence is less likely to be adversely affected by high temperatures, than is the case with such confections skewered onto sticks in the manner heretofore known.

The improved confection of the present invention is produced by rigidly affixing to a wooden or other handle a wafer of crisp pastry, preferably sweetened to increase its palatability, and thereafter securing a block or figure of ice cream to the wafer by adhesion. The whole may then be coated or dipped in chocolate or other coating material, to assist in preserving the confection and in holding together the ice cream and the wafer.

In the accompanying drawing Fig. 1 is a perspective view of the improved confection as completed and in the preferred form; Fig. 2 is a vertical transverse section on line 2—2 of Fig. 1; Fig. 3 is a fragmentary perspective of the mold and contents during the operation of joining the ice cream to the wafer; Fig. 4 is a view in perspective of an alternative form of wafer.

Referring to Fig. 2, the reference letter A represents a block of ice cream which has been firmly adhered to the wafer B as hereinafter described. The handle C may consist of a thin strip of wood or other material, for instance, an edible substance such as hardened taffy or the like. The portion of the handle C which lies between the ice cream and the wafer is coated with an edible cementing medium D, for instance dipping chocolate, by means of which a firm connection between the handle C and the wafer B is secured. A coating E of chocolate or other comparatively hard edible material surrounds the entire structure, with the exception of the projecting end of the handle C.

The relatively wide and thin wafer B may be provided with a conventional ridged or otherwise roughened surface, to aid in the adhesion of the block of ice cream to the wafer. The handle C is provided at one end with a coating of some edible cementing medium, such as chocolate, and is placed in contact with the wafer B. It has been found that, upon hardening of the cementing medium, a very secure connection between handle and wafer is achieved, resulting in a structure which is substantially unitary. If, for instance, dipping chocolate is used as the cementing medium, the resulting connection is so secure that an attempt to separate the wafer and the handle will result in destruction of the wafer.

Fig. 3 illustrates one form of ice cream mold which may be used in practising the present invention. The mold F is formed of metal or other suitable material, and may be of any desired shape conforming, of course, to the shape of the wafer B, which likewise may be varied at will. A recess $f$ is provided in the wall at one end of the mold F, to permit the registry therein of the handle C, as hereinafter described. In fabricating the improved confection of this invention, the mold F is charged with ice cream in a semi-hardened condition. Such a charge of ice cream is shown in fragmentary view in Fig. 3. After the handle C has been secured to the wafer B as described above, the wafer is inserted in the mold F and pressed against the charge of ice cream therein, as shown in Fig. 3 causing it to adhere firmly thereto. The projecting portion of the handle C fits into the recess $f$. In performing this operation the side of the wafer to which the handle is secured is preferably placed next to the ice cream, so that the finished confection does not disclose a lumpy appearance adjacent the handle. However, the ice cream may be applied to the other side of the wafer with satisfactory results, so far as rigidity of the resulting product is concerned.

The ice cream is then allowed to harden, in the mold, to a degree which will permit its withdrawal therefrom without deformation. The entire structure, with the exception of the projecting end of the handle C is then dipped into chocolate or other coating substance and allowed to harden at a low temperature. This results in the formation of a rigid casing about the ice cream and wafer, binding them firmly together.

As described above, the handle C has previously been firmly secured to the wafer B. Therefore, when the ice cream or other substance A is secured to the wafer B, a substantially integral structure is formed, consisting of the handle, wafer, ice cream, and chocolate or other coating. This novel confection may be held in the hand, by means of the uncoated end of the handle C, while being eaten, and will have no tendency to slip from the handle, even when the ice cream is soft, due to the very firm connection between the handle and the wafer, and the large surface of contact between the wafer and the ice cream.

Instead of using a cementing medium to secure the wafer B to the handle C, the latter may be inserted in the wafer during the baking process, and the wafer baked onto the handle, thus effecting a firm connection therebetween. Various other changes in the method described above may be made in accordance with the present invention. For instance, instead of dipping the handle C in chocolate or other edible cementing substance before applying the wafer, the latter might be dipped or coated with a suitable substance and the handle then applied thereto. If desired, the wafer may be of the form illustrated in Fig. 4, which provides a recess, b, into which the handle C may be inserted and cemented, thus forming a very strong connection between handle and wafer. It is obvious that any shape or material may be used for the handle, so long as a suitable adhesion surface is provided for joining the handle to the wafer.

Frozen custards, whipped cream or any confection which, when hardened, will adhere to the wafer may be used in place of ice cream. Any suitable sticky confection may be substituted for chocolate in cementing the handle to the wafer and for coating purposes. If desired, the final coating may be omitted, as the ice cream, etc., will adhere to the large flat surface of the wafer even in the absence of such a coating, if the confection is preserved at a low temperature to prevent melting. Other variations may be made in the process and product of the present invention without departing from the scope thereof.

What I claim is:

1. In a confection, a handle member, a wafer of pastry enveloping one end of said handle member, and a block of edible material having a side equal in area to one side of said wafer, said block of edible material being secured to said wafer by adhesion.

2. In a confection, a handle comprising a flat stick, a relatively wide wafer of edible material cemented firmly against one of the wide surfaces of said handle member, a block of edible material secured to said wafer by adhesion, and a coating of edible material surrounding said wafer and said block of edible material, whereby said block of edible material is more firmly bound to said wafer.

3. A confection comprising a flat handle member, a relatively wide edible wafer secured to one of the wide surfaces of said handle member by an edible cementing medium, a block of ice cream secured to said wafer by adhesion, and a coating of relatively hard edible material surrounding said wafer and said block of ice cream.

4. The process of fabricating a confection which consists in securing a relatively wide wafer to a relatively wide surface formed on a handle member and securing a block of edible material to said wafer by pressing said block and said wafer together, causing said block to adhere to said wafer.

5. The process of fabricating a confection which consists in securing a relatively wide edible wafer to a relatively wide surface formed on a handle member, securing a block of edible material to said edible wafer by pressing said block and said wafer together and thereby causing said block to adhere to said wafer, and coating said block of edible material and said edible wafer with a coating of edible material, whereby said block and said wafer are retained in said adhering relationship.

ROBCLIFF V. JONES.